United States Patent [19]
Mochizuki et al.

[11] Patent Number: 5,639,503
[45] Date of Patent: Jun. 17, 1997

[54] METHOD OF SEPARATING NUTS FROM KERNELS IN A NUT-AND-KERNEL MIXTURE

[75] Inventors: Keizo Mochizuki; Atsuko Suzuki, both of Saitama-ken; Kouji Ishige, Shizuoka-ken, all of Japan

[73] Assignees: Meiji Seika Kaisha, Ltd., Tokyo; Tokai Nuts Co., Ltd., Shizuoka-ken, both of Japan

[21] Appl. No.: 569,946

[22] Filed: Dec. 8, 1995

[30] Foreign Application Priority Data

Dec. 8, 1994 [JP] Japan .................................. 6-304704

[51] Int. Cl.⁶ .................................................. A23L 1/36
[52] U.S. Cl. .......................... 426/632; 426/478; 426/479; 426/482; 426/484; 426/629

[58] Field of Search ..................................... 426/632, 629, 426/478, 479, 482, 484

[56] References Cited

FOREIGN PATENT DOCUMENTS 55-114375  9/1980  Japan .
1-199683   8/1989  Japan .

*Primary Examiner*—Helen Pratt
*Attorney, Agent, or Firm*—Nikaido, Marmelstein, Murray & Oram LLP

[57] ABSTRACT

Disclosed is a method of separating nuts from kernels in a nut-and-kernel mixture in terms of the sound characteristic of nuts or kernels. Specifically each and every nut or kernel is allowed to produce sound to distinguish nuts from kernels in terms of nut-representative, 6-to-16 kilohertz high sound components detected, if any in the produced sound.

5 Claims, 3 Drawing Sheets

METHOD OF SEPARATING NUTS FROM KERNELS IN A NUT-AND-KERNEL MIXTURE

BACKGROUND OF THE INVENTION

1. Field of the Invention

The present invention relates to a method of separating nuts from kernels in a nut-and-kernel mixture. Such separation is difficult to be attained with recourse to difference in weight or color. The present invention effects a required separation in terms of different sounds produced by nuts and kernels when rolling or falling. In the specification and claims, the word "nut" means a nutmeat completely or partly surrounded by a shell. And the word "kernel" means nutmeat having no surrounding shell.

2. Description of Related Art

Foreign substances and poor quality nuts such as deformed or unmatured nuts are found in large amounts of almonds, cashew nuts, groundnuts, hazel nuts, pistachio nuts and other nuts, and are separated by hands. In the hope of saving tedious, laborious work a method of separating nuts from kernels in a nut-and-kernel mixture in terms of the optical reflecting characteristics is proposed for separation in Japanese Patent Publication 1-199683(A). Specifically, the proposed method uses the noted difference of reflective coefficients of nuts and kernels when exposed to the near infrared rays of 1,200 nm-long wavelength.

A method and apparatus of separating nuts from kernels in a nut-and-kernel mixture in terms of the distinctive spectral characteristics of reflecting rays is proposed for separation in Japanese Patent Publication 52-145277(A). Also, a method of separating beans of good quality from beans of poor quality in terms of their dynamic characteristics is proposed in Japanese Patent Publication 55-114375 (A). Beans of good quality can be easily rolled. Beans of poor quality deformed by insect erosion, blight or immaturity are incomplete in shape (remote from spherical form), and therefore, such deformed pieces cannot be easily rolled.

The manual separation by sight has many problems, as for instance follows: the separating efficiency is low; the separating capability lowers with time; and the labor expense is high. The method of Japanese Patent Publication 55-114375 (A) cannot be applied to the separation of nuts from kernels in case each nuts having good quality and also a thin shell surrounding a nutmeat because of little or no difference in rolling characteristics. As for the methods of Japanese Patent Publications 1-199683(A) and 52-145277(A), these proposed methods cannot be applied to hazel nuts and other nuts which show substantially same optical reflecting characteristics for shells and kernels, thus permitting no distinction therebetween with recourse to their reflecting characteristics. The shells and kernels of hazel nuts are hardly distinguishable in color even by sight, and therefore, it is most likely that nuts are overlooked and are present among kernels, and when such nuts are put in mouth and crushed by teeth, sometimes teeth are damaged by counter force of excessive strength.

There has been an ever increasing demand for automatically separating nuts from kernels in a nut-and-kernel mixture, particularly in case that nuts and kernels have same dynamic or optical characteristics.

The inventor discovered that nuts and kernels produce distinctive sounds characteristic of nuts and kernels, in terms of which nuts and kernels can be separated from each other. Specifically nuts when rolling or falling will produce a sound having an increased sound pressure in the range of about 6 to 16 kilohertz, whereas kernels when rolling or falling will produce little or no sound components in the same range.

SUMMARY OF THE INVENTION

To meet such demand a method of separating nuts from kernels in a nut-and-kernel mixture according to the present invention comprises the steps of: feeding nuts and kernels one by one; rolling and/or dropping nuts and kernels to produce sound; collecting and analyzing the so produced sound to distinguish nuts from kernels in terms of the sound characteristic of nuts or kernels; and separating nuts from kernels in terms of the characteristic sound representing nuts.

Nuts can be distinguished from kernels in terms of the sound components whose frequency range covers about 6 to 16 kilohertz.

The step of rolling and/or dropping nuts and kernels may include the step of using a sound-deadening type mono-screw conveyor for rolling nuts and kernels individually and/or using a sound-deadening resin plate on which nuts and kernels fall one after another.

The step of collecting and analyzing the so produced sound may include the step of: collecting and converting the sound to alternating current voltage; amplifying the alternating current voltage; filtering and separating the characteristic component of alternating current voltage whose frequency range covers about 6 to 16 kilohertz, if any; and permitting a separator to be controlled in response to the characteristic component of alternating current voltage.

The separator may comprise a microphone for collecting the sound produced by the rolling and/or falling nuts and kernels, an amplifier connected to the microphone, a filter circuit for selectively passing the characteristic component of alternating current voltage, a relay circuit connected to the filter circuit, a solenoid-operated valve connected to the relay circuit for operating in response to appearance of the characteristic component voltage signal, a pneumatic piston cylinder operatively connected to the solenoid-operated valve, and a collecting chute equipped with gate means controlled by the pneumatic piston cylinder for opening or closing.

Other objects and advantages of the present invention will be understood from preferred embodiments of the present invention which are shown in accompanying drawings.

DESCRIPTION OF THE PREFERRED EMBODIMENTS

Figure 1:
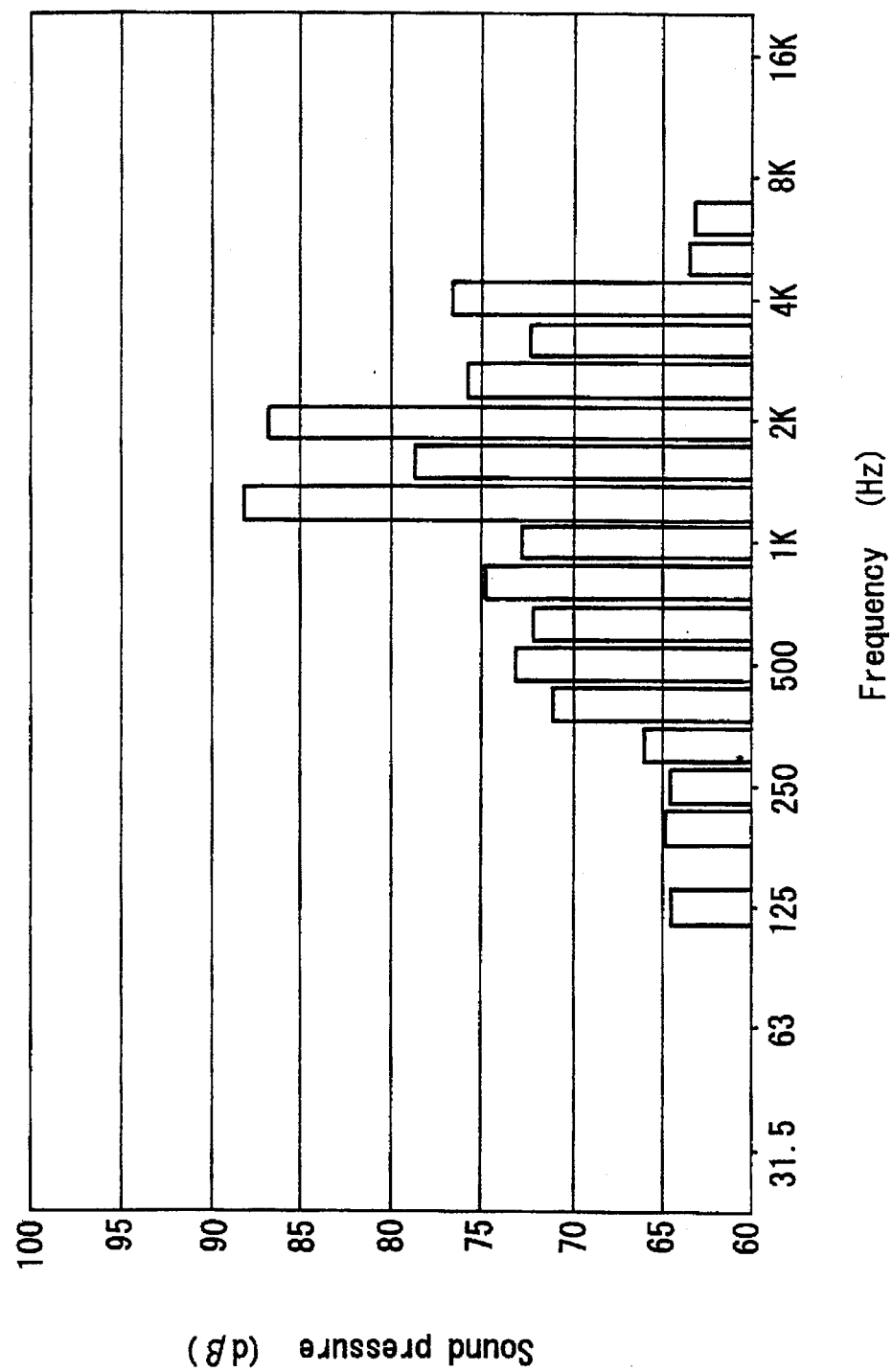
FIG. 1 Is a sound pressure versus frequency graph of the sound produced when kernels of hazel nuts fall.
Figure 2:
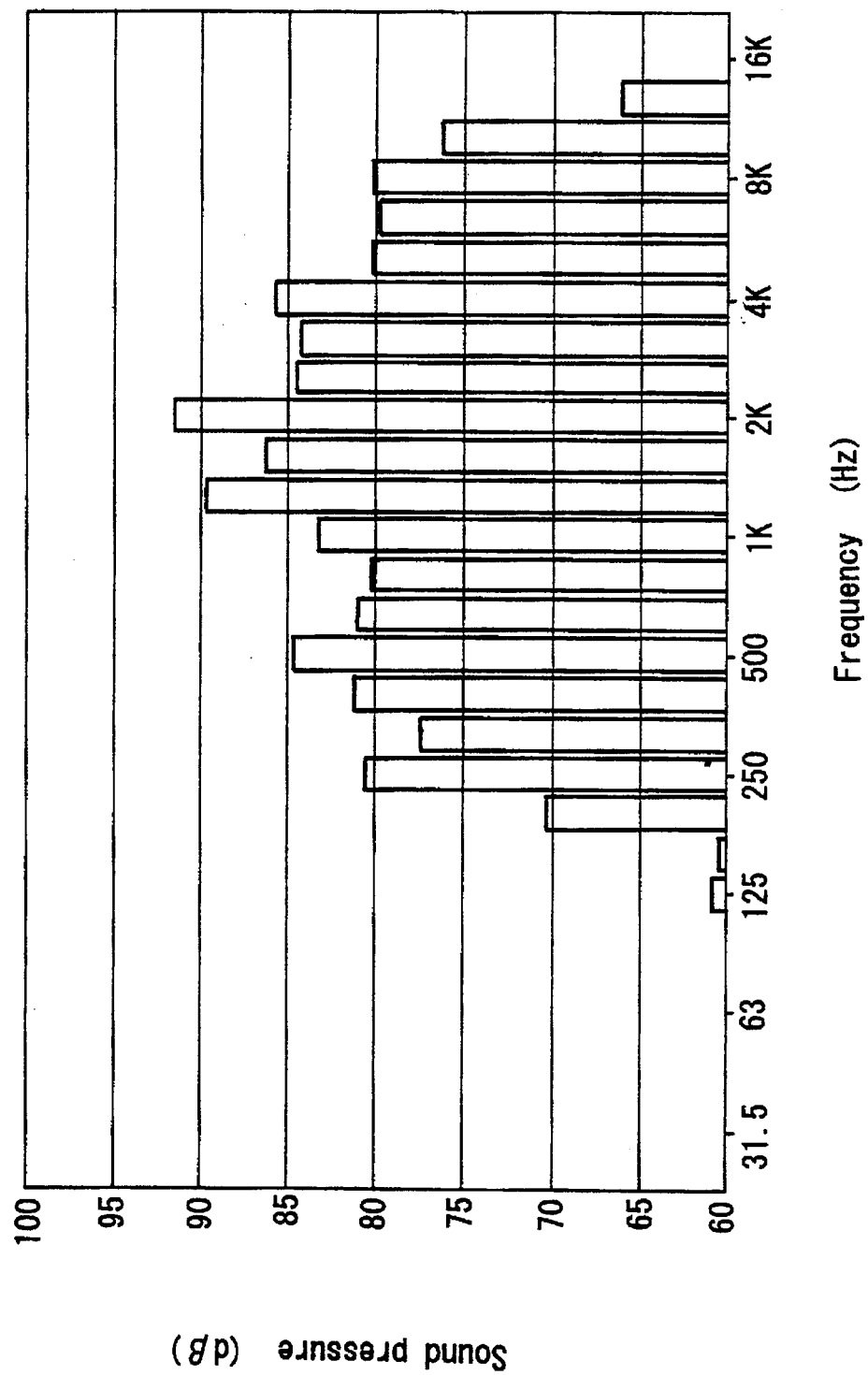
FIG. 2 is a similar graphic representation, but showing the sound pressure versus frequency graph of the sound produced when hazel nuts fall.

Kernels of hazel nuts were allowed to fall on a sound-deadening resin plate from a 50 centimeter-high level, and then the produced sound was collected by a microphone, and was recorded on a magnetic tape by a digital audio-recorder. The so recorded sound was subjected to frequency analysis with the aid of a frequency analyzer (Type 2123; Bruel & Kjear). The result is shown in FIG. 1. FIG. 2 shows the result of similar sound pressure versus frequency graph of the sound produced by nuts of hazel nuts.

These results reveal that the sound pressure of kernels is remarkably weak comparing nuts in the frequency range covering 6 to 16 kilohertz. This implies the possibility of separating nuts from kernels in terms of sound pressure whose frequency range covers 6 to 16 kilohertz.

A method of separating nuts from kernels in a nut-and-kernel mixture according to the present invention comprises the steps of: (1) feeding nuts and kernels one by one; (2) rolling and/or dropping nuts and kernels to produce sound; (3) collecting and analyzing the so produced sound to distinguish nuts from kernels in terms of the sound characteristic of nuts or kernels; and (4) collecting separately nuts in terms of the characteristic sound component. Each step is described below in detail.

(1) The step of feeding nuts and kernels one by one:
it is necessary to measure the sound produced by each and every nut or kernel, and therefore, these nuts and kernels are carried one by one, for instance by a fined conveyor or any other means appropriate for conveying nuts and kernels one by one without producing sound of high frequencies.

(2) The step of rolling and/or dropping nuts and kernels to produce sound:
nuts and kernels are shifted from the fined conveyor, for example to a sound-deadening type mono-screw conveyor, thus permitting nuts and kernels alone to produce sounds; the sound produced by each and every nut contains sound components of 6 to 16 kilohertz whereas the sound produced by each and every kernel contains little or no sound components of 6 to 16 kilohertz.

Alternately nuts and kernels may be made to fall on a sound-deadening resin plate (for instance, rubber-coated resin plate) one by one, thus permitting each and every piece to produce sound. The accuracy with which nuts can be separated from kernels is 99% or more.

These alternate modes of causing nuts and kernels to produce their characteristic sounds may be used jointly. The accuracy with which nuts can be separated from kernels can be improved by first, rolling these pieces for first separation, and second, letting the so separated pieces to fall for second separation.

(3) The step of collecting and analyzing the so produced sound to distinguish nuts from kernels in terms of the sound component characteristic of nuts or kernels:
A microphone is positioned in the vicinity of the place in which nuts and kernels are rolled or made to fall individually, thereby collecting the sound produced by the rolling or falling pieces. The alternating current signal representing the so collected sound is amplified, and the signal components whose frequency ranges from 6 to 16 kilohertz are allowed to pass through an associated filter. The so selected signal components representing a single piece of nut is directed to a relay circuit, which is connected to a solenoid-operated valve. Thus, the valve is made to open, thereby driving an associated pneumatic piston cylinder on every appearance of nuts just in front of the pneumatic device and gate.

(4) The step of separating nuts from kernels in terms of the characteristic sound representing nuts:
the pneumatic piston cylinder when driven opens an associated gate means to allow the nut to go to a nut-collecting storage.

Following table shows the accuracies with which kernels of almonds, cashew nuts and hazel nuts can be separated from nuts. The results are ones obtained by applying the present separating method to each nut-and-kernel mixture 10 Kg including 100 nuts therein respectively.

| kinds of nuts | separation accuracies (%) |
|---|---|
| almonds | 99 |
| cashew nuts | 99 |
| hazel nuts | 100 |

Separation accuracies are given by: (the number of separated nuts/100 pieces) × 100%

Figure 3:
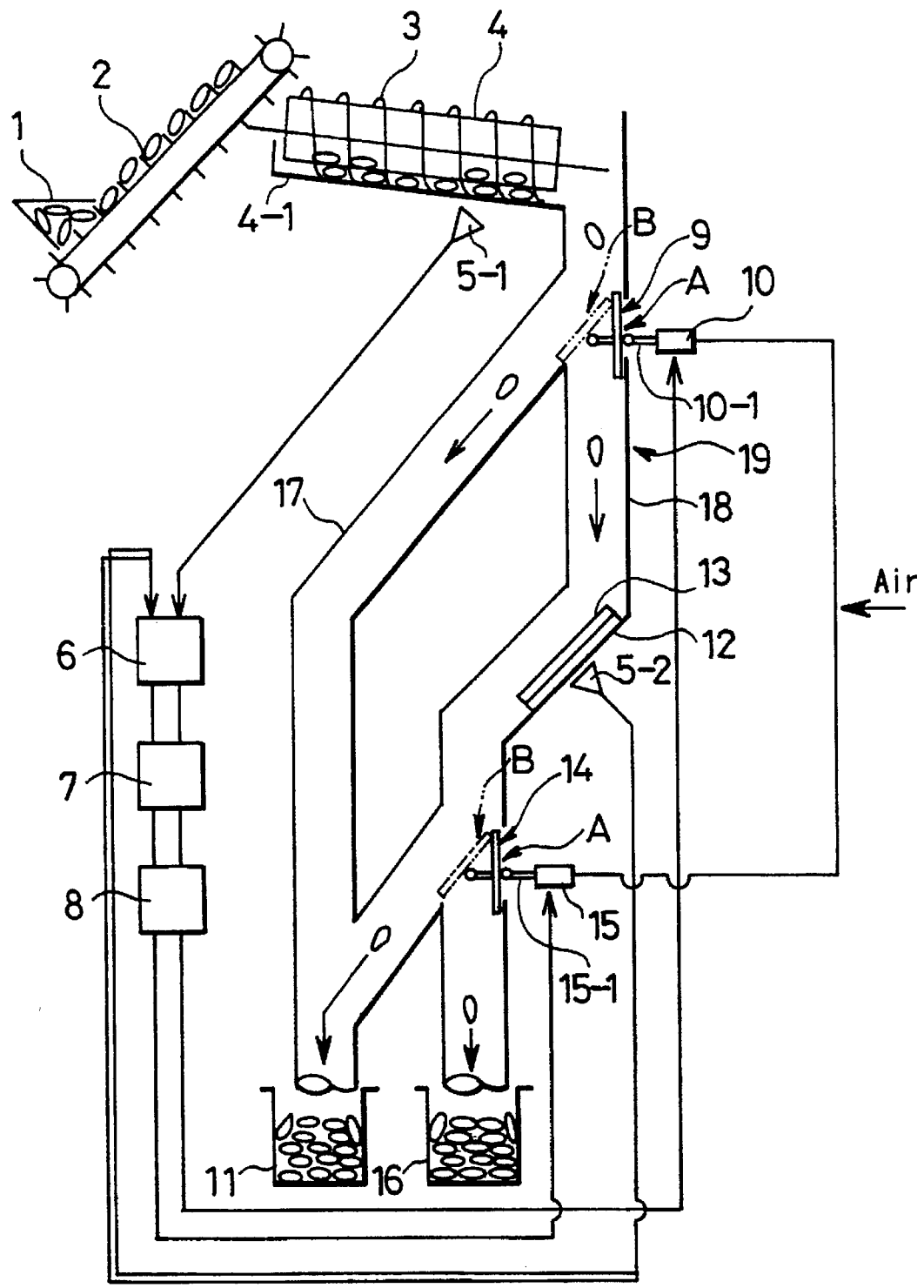
FIG. 3 shows schematically a separator using the method of the present invention.

Referring to FIG. 3, nuts and kernels are put in a hopper 1, and then these nuts and kernels are supplied to a fined conveyor 2 to be carried one by one to a sound-deadening type mono-screw conveyor 4. It has a rubber spiral 3 wound its plastic rubber cylinder, thus preventing the producing of sound.

While a line of nuts and kernels are made to advance while rolling by the spiral 3 of the spiral conveyor 4, these pieces produce their characteristic sounds.

A microphone 5-1 collects the sound produced by the rolling pieces, and alternating current signal representing the so collected sound is amplified by an amplifier 6. Then, nut-representative, 6-to-16 kilohertz high components when appearing in the collected signal are allowed to selectively pass through a filter circuit 7. The so selected signal components representing a single piece of nut is directed to a relay circuit 8, which is connected to a solenoid-operated valve 10. Then, the valve 10 is energized to eject a stream of air. As a result, an associated pneumatic piston cylinder 10-1 to put an associated damper 9 from opening position A to closing position B, thereby allowing the nut to roll down on a chute 17, falling in a nut-collecting storage 11.

Little or no sound components of 6-to-16 kilohertz high components appear in the collected signal, indicating the presence of kernels, and then, the solenoid-operated valve 10 is not energized, keeping the damper 9 in opening position A to allow kernels to fall on a resin plate 13 via a chute 18.

The resin plate 13 is used for effecting another analysis of the sound produced by the falling piece when striking the resin plate 13. The resin plate 13 is lined with a rubber sheet 12, thereby preventing the sound produced by resonance.

Similarly a microphone 5-2 collects the sound produced by the falling pieces, and the alternating current signal from the microphone 5-2 contains little or no components of 6 to 16 kilohertz, not driving a piston-and-cylinder 15-1 to keep an associated damper 14 in opening position A. Thus, kernels are allowed to fall in a kernel-collecting storage 16. With this arrangement nuts can be separated from kernels at the 99 percent accuracy.

We claim:

1. Method of separating nuts from kernels in a nut-and-kernel mixture comprising the steps of:
   feeding nuts and kernels one by one;
   rolling and/or dropping nuts and kernels to produce sound;
   collecting and analyzing the so produced sound to distinguish nuts from kernels in terms of the sound characteristic of nuts or kernels; and
   separating nuts from kernels in terms of the characteristic sound representing nuts.

2. Method of separating nuts from kernels in a nut-and-kernel mixture according to claim 1, wherein nuts are distinguished from kernels in terms of the sound component whose frequency range covers about 6 to 16 kilohertz.

3. Method of separating nuts from kernels in a nut-and-kernel mixture according to claim 2, wherein the step of rolling and/or dropping nuts and kernels includes the step of using a sound-deadening type mono-screw conveyor for rolling nuts and kernels individually and/or using a sound-deadening resin plate on which nuts and kernels fall one after another.

4. Method of separating nuts from kernels in a nut-and-kernel mixture according to claim 1, wherein the step of collecting and analyzing the so produced sound includes the step of: collecting and converting the sound to alternating current voltage; amplifying the alternating current voltage; filtering and separating the characteristic component of alternating current voltage whose frequency range covers about 6 to 16 kilohertz, if any; and permitting a separator to be controlled in response to the characteristic component of alternating current voltage.

5. Method of separating nuts from kernels in a nut-and-kernel mixture according to claim 4, wherein the separator comprises a microphone for collecting the sound produced by the rolling and/or falling nuts and kernels, an amplifier connected to the microphone, a filter circuit for selectively passing the characteristic component of alternating current voltage, a relay circuit connected to the filter circuit, a solenoid-operated valve connected to the relay circuit for operating in response to appearance of the characteristic component voltage signal, a pneumatic piston cylinder operatively connected to the solenoid-operated valve, and a collecting chute equipped with gate means controlled by the pneumatic piston cylinder for opening or closing.

* * * * *